Oct. 16, 1928.

D. BERGER

MASSAGE IMPLEMENT

Filed Feb. 29, 1928    2 Sheets-Sheet 1

1,688,226

INVENTOR.
David Berger.
BY
Bryant & Lowry
ATTORNEYS

Oct. 16, 1928.　　　　　　　　　　　　　　　　1,688,226
D. BERGER
MASSAGE IMPLEMENT
Filed Feb. 29, 1928　　　2 Sheets-Sheet 2
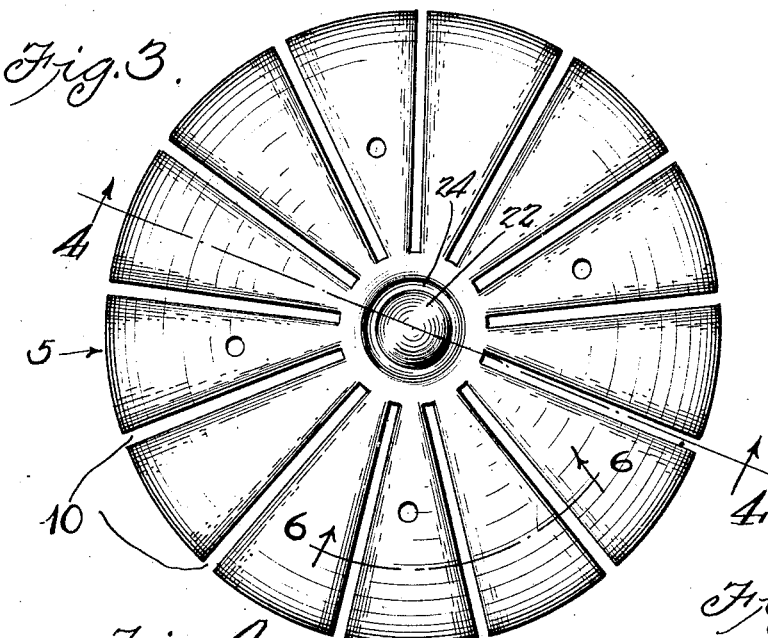
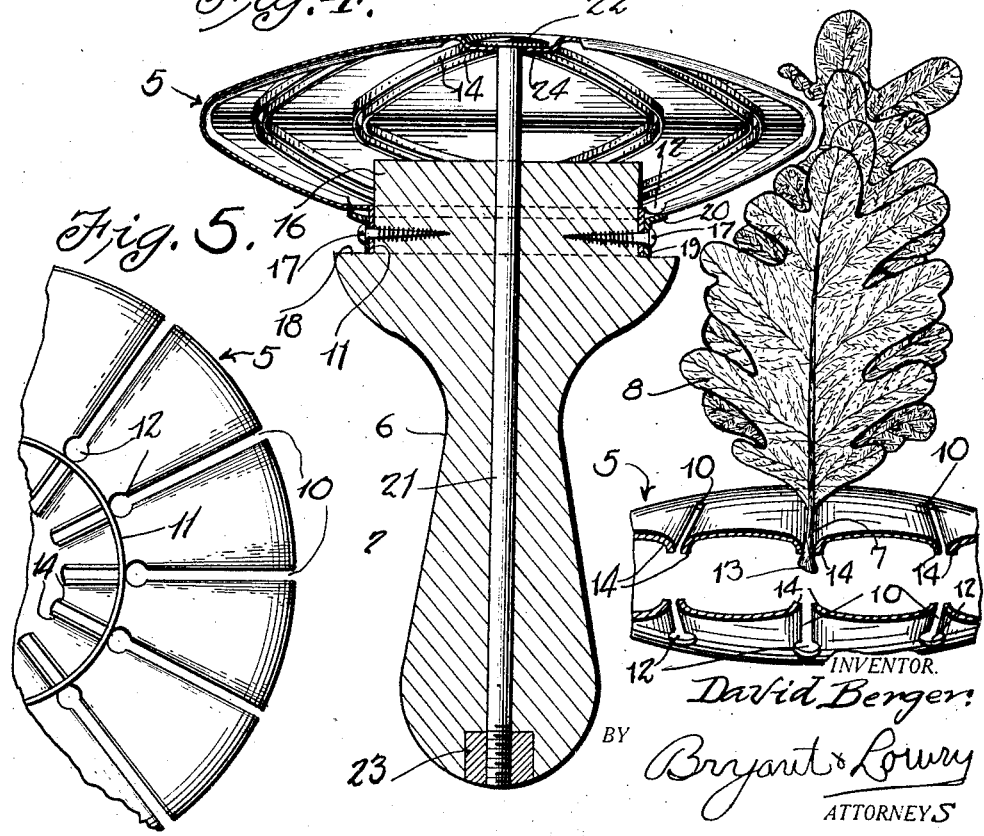
INVENTOR.
David Berger
BY Bryant & Lowry
ATTORNEYS Patented Oct. 16, 1928.

1,688,226

UNITED STATES PATENT OFFICE.

DAVID BERGER, OF PHILADELPHIA, PENNSYLVANIA.

MASSAGE IMPLEMENT.

Application filed February 29, 1928. Serial No. 257,993.

This invention relates to an improved implement for use in massaging the body, and the primary object of the invention is to provide an implement of this kind embodying a rubbing head composed of numerous compactly arranged tree leaves and adapted to be immersed in hot water when used to massage the body, thereby producing invigorating and otherwise beneficial effects upon the patient.

Another object is to provide a massage implement of the above kind having a rubbing head composed of a plurality of compactly arranged leaves of the oak tree, which leaves, when immersed in hot water and employed in a saturated and heated condition for massaging the body, are calculated, by reason of their nature and characteristics, to produce beneficial effects upon the skin and body of the patient.

A more specific object is to provide a massage implement of the above kind embodying a holder having a handle and constructed to effectively hold and engage and retain the leaves in a bulbous compactly arranged form for efficient use in massaging the body.

Still another object is to so construct the holder as to permit the ready assembly of the leaves therewith by engagement of the stems of the leaves, whereby the latter are effectively retained in assembled relation to form the rubbing head of the implement.

Other objects will appear as the nature of the invention is better understood, and the same consists in the novel form, combination and arrangement of parts hereinafter more fully described, shown in the accompanying drawings and claimed.

In the drawings:

Figure 3 is an enlarged top plan view of the holder;

Figure 4 is a central vertical section taken on line 4—4 of Figure 3;

Figure 5 is a fragmentary bottom plan view of the holder with the handle thereof detached; and Figure 6 is a fragmentary section on line 6—6 of Figure 3, with a few leaves positioned in place to reveal the manner in which they are held in assembled relation with the holder.

Figure 1:
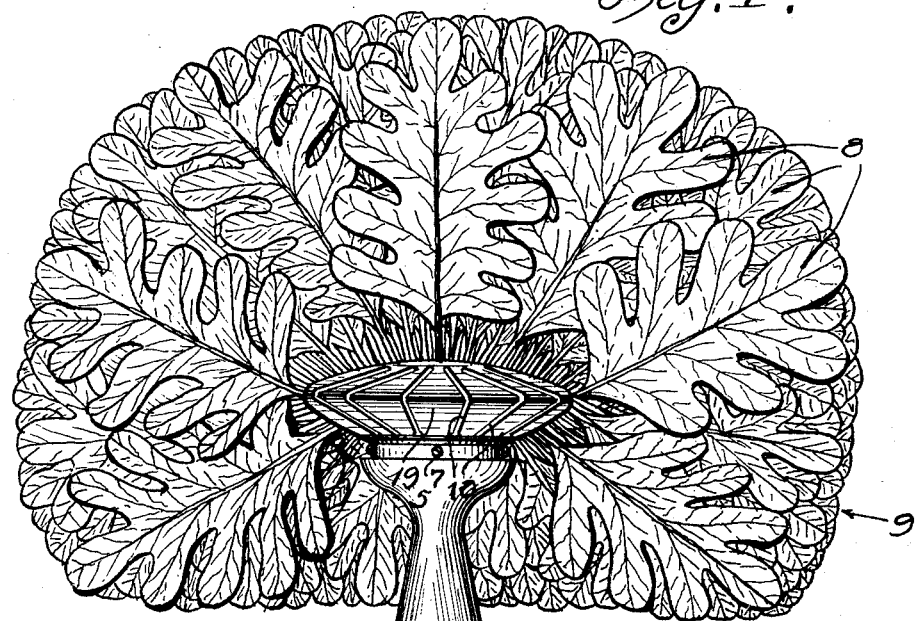
Figure 1 is a side elevational view of a massage implement embodying the present invention, some of the leaves of the rubbing head being omitted to more clearly reveal the construction.
Figure 2:
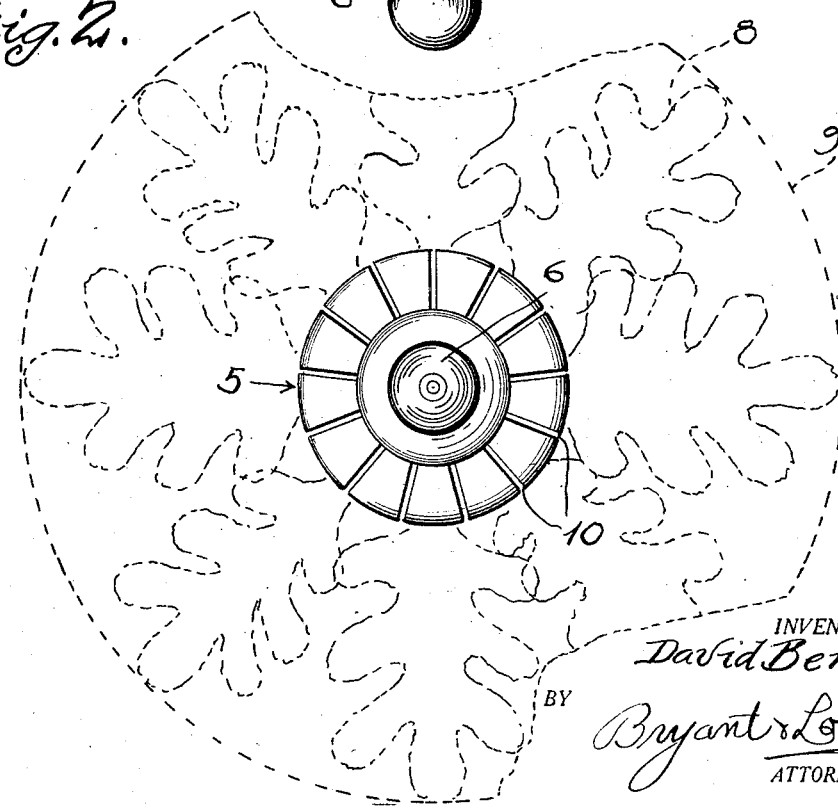
Figure 2 is a diagrammatic plan view showing the form of the head by dotted lines and the relations thereof to the holder which is shown in top plan.

Referring more in detail to the drawings, the present invention broadly embodies a holder 5 having a handle 6 and with which are engaged the stems 7 of numerous leaves 8 of the oak tree, which leaves are so assembled and compactly arranged to radiate from the holder 5 as shown in Figures 1 and 2, to provide a relatively large bulbous rubbing head 9.

As shown, the holder 5 consists of a hollow silver or aluminum shell of circular form in plan and somewhat flattened vertically into substantially elliptical cross-sectional form as illustrated in Figure 4, and provided in this holder at uniformly spaced intervals is a circular series of radial slots 10 which extend through the top and bottom walls of the holder from a point adjacent the center of the top wall to points adjacent the central depending annular flange 11 of the bottom wall, where said slots are enlarged to provide stem entrance openings.

A characteristic of the stems 7 of oak leaves is that they terminate in relatively strong or tough enlargements 13, and the slots 10 are made narrower than these enlargements although of sufficient width to permit the passage of the outer more slender portions of the stems 7 therethrough. The entrance openings 12 are of sufficient size to permit the passage of the enlarged ends 13 of the stems 7, and it will thus be apparent that the leaves may be successively engaged with the holder by inserting the enlarged ends 13 of the stems through the entrance openings 12 and then sliding the leaves outwardly and then inwardly in the slots 11 toward the terminals thereof adjacent the center of the top wall of the holder. As the holder is filled, successive leaf stems will be engaged and positioned in the portions of the slot 10 provided in the bottom wall of the holder as indicated in Figure 1.

In order to effectively grip the enlarged ends of the stems 7 and tightly hold the leaves assembled with the holder the longitudinal walls of the slot 10 are inturned or directed inwardly as at 14.

In view of the above it will be seen that when sufficient leaves are assembled with the holder as to have their stems 7 completely fill the slots 10 as shown in Figure 1, a relatively large bulbous rubbing head 9 will be provided composed of numerous compactly arranged leaves of the oak tree.

As shown clearly in Figures 4 and 5, the bottom wall of the holder 5 is provided with a relatively large central opening and has a depending cylindrical flange 15 in surrounding relation to this opening and adapted for snug reception of the cylindrical upper end portion 16 of the handle 6, the holder being secured on this end of the handle by means of screws 17 passed through the flanges 15 and threaded into the end of the handle. The end portions 16 preferably consist of a reduced end of the handle whereby an angular shoulder 18 is provided at the bottom of the handle portion 16 with which the lower edge of the flange 15 is abutted for enhancing the rigid relation between the holder and the handle.

Fitted on the flange 15 is a collar 19 through which the screws 17 also pass to secure the collar in place, and this collar 19 has an outwardly directed annular flange 20 at its upper end adapted to underlie and cover the entrance openings 12 so that the adjacent leaves will be held in the slot 10. It is thus apparent that after the leaves are assembled with the holder 5, the latter may be fastened upon the handle 6 with the collar 19 in place upon the flange 15, thus preventing accidental displacement of the leaves 8 out of the slot 10 and effectively maintaining the leaves in place in the assembled relation referred to above.

In order to resist bending of the holder 5 and to therefore reinforce the same, a tie bolt 21 is extended through the handle and through a central opening in the top wall of the holder, the head 22 of the bolt being counter-sunk in the top wall of the holder and having its lower threaded end engaged in a nut 23 countersunk in the outer end of the handle 6 as shown in Figure 4. The countersinking of the head 20 is effected by providing the top wall of the holder with a central depressed portion 24 shaped to accommodate the head 22 of the bolt 21.

In the use of the present implement, the head 9 is immersed in hot water so as to be completely saturated and thereby cause the leaves to soften and liberate such matters contained thereby as are helpful in producing a beneficial effect upon the skin and body when the head thus saturated with hot water is rubbed upon the body. By the use of this implement, a most efficient massaging operation may be accomplished so as to produce an invigorating and otherwise helpful effect upon the body of the patient. When the rubbing head becomes no longer fit for further use, the holder may be readily detached from the handle by removing the fastening screws 17 and the collar 19, whereupon the old leaves may be readily removed and new set or bunch thereof assembled upon the holder for subsequent use.

The construction will be found quite efficient for the intended purpose, and the construction is extremely simple and durable.

Minor changes may be made without departing from the spirit and scope of the invention as claimed.

What I claim as new is:—

1. In a massage implement, a holder embodying a hollow metal shell having a circular series of radial leaf-stem receiving slots, said slots having enlarged portions forming entrance openings for the enlarged ends of the leaf stems.

2. In a massage implement, a holder embodying a hollow metal shell having a circular series of radial leaf-stem receiving slots, said slots having enlarged portions forming entrance openings for the enlarged ends of the leaf stems, and means to close said entrance openings to retain the leaf stems in said slots.

3. In a massage implement, a holder embodying a hollow metal shell having a circular series of radial leaf-stem receiving slots, said slots having enlarged portions forming entrance openings for the enlarged ends of the leaf stems, said slots extending in the top and bottom walls of the shell from points adjacent the center of the top wall to points adjacent the center of the bottom wall and terminating in said entrance openings at the latter points.

4. In a massage implement, a holder embodying a hollow metal shell having a circular series of radial leaf-stem receiving slots, said slots having enlarged portions forming entrance openings for the enlarged ends of the leaf stems, said slots extending in the top and bottom walls of the shell from points adjacent the center of the top wall to points adjacent the center of the bottom wall and terminating in said entrance openings at the latter points, the bottom wall of the shell having a central opening and provided with an annular flange about said opening, and a collar fitting on said flange and covering said entrance openings.

5. In a massage implement, a holder embodying a hollow metal shell having a circular series of radial leaf-stem receiving slots, said slots, having enlarged portions forming entrance openings for the enlarged ends of the leaf stems, said slots extending in the top and bottom walls of the shell from points adjacent the center of the top wall to points adjacent the center of the bottom wall and terminating in said entrance openings at the latter points, the bottom wall of the shell having a central opening and provided with an annular flange about said opening, and a collar fitting on said flange and covering said entrance openings, a handle having a reduced end fitting and secured in said annular flange.

6. In a massage implement, a holder embodying a hollow metal shell having a circular series of radial leaf-stem receiving slots, said slots having enlarged portions forming entrance openings for the enlarged ends of the leaf stems, said slots extending in the top and bottom walls of the shell from points adjacent the center of the top wall to points adjacent the center of the bottom wall and terminating in said entrance openings at the latter points, the bottom wall of the shell having a central opening and provided with an annular flange about said openings, a collar fitting on said flange and covering said entrance openings, a handle having a reduced end fitting and secured in said annular flange, and a tie bolt between the top wall of the shell and the handle extending axially through the latter.

In testimony whereof I affix my signature.

DAVID BERGER.